(12) United States Patent
Brehm

(10) Patent No.: US 11,586,052 B1
(45) Date of Patent: Feb. 21, 2023

(54) ARMLESS EYEWEAR WITH ADJUSTABLE CORDS

(71) Applicant: Jensen Graham Brehm, Kirkland, WA (US)

(72) Inventor: Jensen Graham Brehm, Kirkland, WA (US)

(73) Assignee: Ombraz Inc., Clyde Hill, WA (US)

( * ) Notice: Subject to any disclaimer, the term of this patent is extended or adjusted under 35 U.S.C. 154(b) by 208 days.

(21) Appl. No.: 16/724,647

(22) Filed: Dec. 23, 2019

Related U.S. Application Data

(63) Continuation of application No. 15/795,165, filed on Oct. 26, 2017, now Pat. No. 10,514,556.

(51) Int. Cl.
| | | |
|---|---|---|
| *G02C 5/16* | (2006.01) | |
| *G02C 5/20* | (2006.01) | |
| *G02C 3/00* | (2006.01) | |

(52) U.S. Cl.
CPC ............. *G02C 5/20* (2013.01); *G02C 3/003* (2013.01); *G02C 5/16* (2013.01)

(58) Field of Classification Search
CPC . G02C 3/003; G02C 5/20; G02C 5/16; G02C 5/2209; G02C 5/2254; G02C 11/02; G02C 3/006; Y10T 24/1371
USPC .......................................... 351/111, 114, 156
See application file for complete search history.

(56) References Cited

U.S. PATENT DOCUMENTS

| | | | | |
|---|---|---|---|---|
| 1,596,019 | A * | 8/1926 | Nelson ................. | G02C 3/003 D16/311 |
| 3,397,026 | A * | 8/1968 | Spina ................... | G02C 3/003 2/13 |
| 4,391,498 | A * | 7/1983 | Rengstorff ............ | G02C 3/003 351/111 |
| 5,162,823 | A * | 11/1992 | Goldstein ............. | G02C 3/003 351/111 |
| 5,541,676 | A * | 7/1996 | Pallat ................... | G02C 3/003 24/3.3 |
| 6,550,110 | B1 * | 4/2003 | Kawashima .......... | A44B 11/04 24/3.3 |
| 6,817,068 | B2 * | 11/2004 | Cleary ................. | A61F 9/027 2/426 |
| 2008/0246913 | A1 * | 10/2008 | Wong ................... | G02C 1/04 351/41 |
| 2010/0283960 | A1 * | 11/2010 | Berdou ................. | G02C 5/006 351/156 |

(Continued)

FOREIGN PATENT DOCUMENTS

FR       2678078 A1 * 12/1992  ........... G02C 11/00

*Primary Examiner* — Mahidere S Sahle
(74) *Attorney, Agent, or Firm* — John J. Bamert, Esq.; Bamert Regan PLLC

(57) ABSTRACT

Embodiments are directed to eyewear. The eyewear may include a frame, a left cord, a right cord, and an adjustable coupler. The frame may have a left end piece and a right end piece. Each of the left and right end pieces may have one or more apertures. The left cord has a proximal end portion and a distal end portion. The proximal end portion of the left cord may extend through at least one of the one or more apertures in the left end piece. The right cord has a proximal end portion and a distal end portion. The proximal end portion of the right cord may extend through at least one of the one or more apertures in the right end piece. The adjustable coupler may couple the left cord to the right cord.

20 Claims, 7 Drawing Sheets

(56) References Cited

U.S. PATENT DOCUMENTS

| | | | |
|---|---|---|---|
| 2010/0283962 A1* | 11/2010 | Williams | G02C 3/003 |
| | | | 351/157 |
| 2014/0071398 A1* | 3/2014 | Glassco | G02C 3/006 |
| | | | 351/157 |
| 2019/0000711 A1* | 1/2019 | Pundyk | A61H 1/006 |

* cited by examiner

ARMLESS EYEWEAR WITH ADJUSTABLE CORDS

CROSS-REFERENCE TO RELATED APPLICATION

This application is a continuation of U.S. patent application Ser. No. 15/795,165, filed on Oct. 26, 2017, which is hereby incorporated by reference herein in its entirety.

TECHNICAL FIELD

The present invention relates generally to armless eyewear and more particularly, yet not exclusively, to armless eyewear with adjustable cords.

BACKGROUND

Over the last 150 years, the general design of eyewear has largely remained the same. Traditional eyewear such as spectacles are typically secured to the face with temple pieces that connected to the sides of the frames and wrapped around the ears. Traditional eyewear is susceptible to falling off a wearer's face or into an uncomfortable position when the wearer looks down or bends over. In attempt to remedy this problem, wearer's may attach a retainer strap (such as those available under the mark CROAKIES®) to the temple tips that wrap around the ears to provide the eyewear with additional retention to the wearer's face. The typical retainer strap can hold the eyeglasses in place during physical activity or can facilitate carrying the eyeglasses while the eyeglasses dangle from the wearer's neck when not in use.

Traditional eyewear, with or without the typical retainer strap, can become uncomfortable if worn for long periods of time as the temple pieces press against the wearer's head or ears, often causing external compression headaches. The traditional eyewear is also heavy, adding to the discomfort of extended use. The bulk of the traditional eyewear also makes storage inconvenient, with the traditional eyewear typically being too large for comfortable storage in a pocket. The temple pieces are also prone to breaking or bending, which can make it difficult to keep the traditional eyewear in a level position on the wearer's face. The various metallic or composite compounds of the traditional eyewear, especially the temple pieces, can lead to allergic skin reactions. Moreover, the hinges that connect the temple pieces to the frame in the traditional eyewear are usually fragile and susceptible to breaking. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
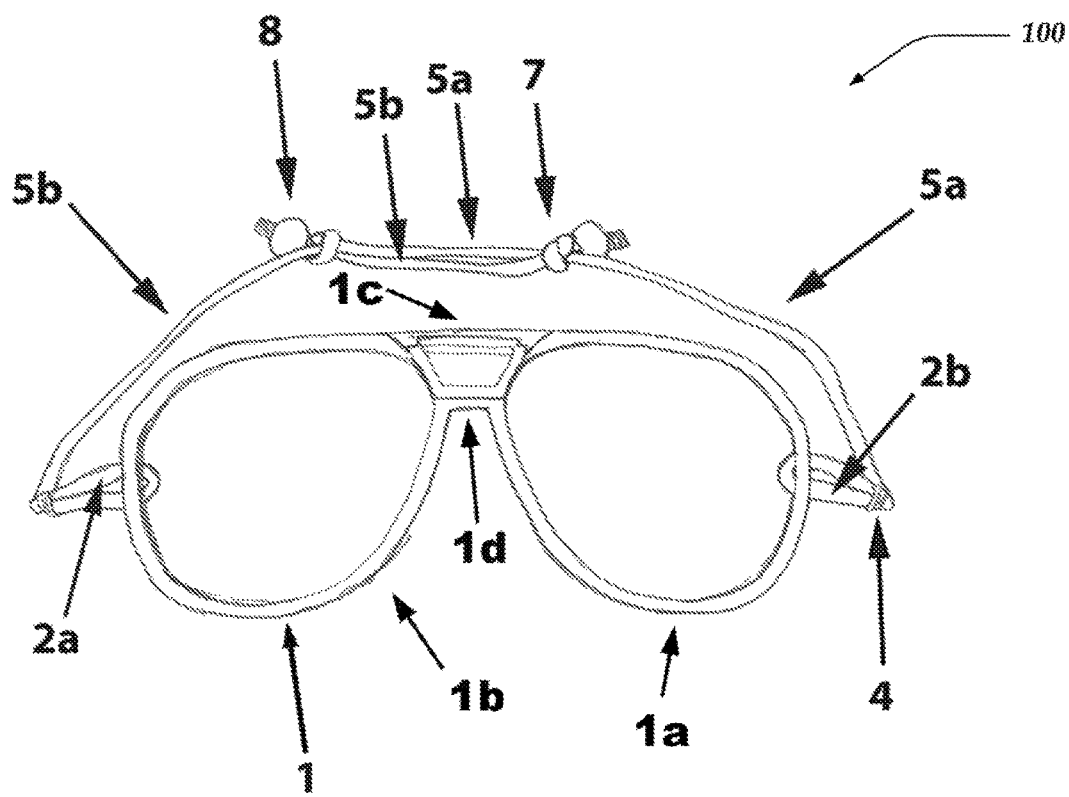
FIG. 1 illustrates a schematic representation of a perspective front view of example armless eyewear having a frame and adjustable cords.

The following briefly describes embodiments of the invention to provide a basic understanding of some aspects of the invention. This brief description is not intended as an extensive overview. It is not intended to identify key or critical elements or to delineate or otherwise narrow the scope. Its purpose is merely to present come concepts in a simplified form as a prelude to the more detailed description that is presented later.

Briefly stated, various portions of the present innovations are directed toward armless eyewear having an armless frame and one or more adjustable retainer cords. End portions of two cords may be coupled to corresponding end pieces of the frame. The armless frame may be without complicated mechanisms that are prone to failure, such as hinges, ball-and-socket joints, and others. For example, each cord may have the end portion looped through one or more apertures in the corresponding end pieces and may have one or more anchors or loop fasteners that couple the looped end portion to a portion of the cord that is distal to the one or more apertures. Examples of the anchors may include tape wraps, knots, snaps, or other fasteners. Each of the cords may have another end portion adjustably coupled to a middle portion of the other cord. For example, each adjustably-coupled end portion may include an adjustable sliding half knot that surrounds the middle portion of the other cord. The effective length of a given one of the cords in this configuration may be the distance between the corresponding end piece and the adjustably-coupled end portion of the other cord. Accordingly, sliding the adjustably-coupled end portions of the cords relative to each other adjusts the effective lengths of the cords.

In implementations employing adjustable knots at the adjustably-coupled end portions of the cords, the wearer can adjust the tightness of the knots to regulate friction of the coupling between the cords to facilitate easy adjustment or locking of the effective lengths of the cords as desired. Grip elements, such as beads, may be coupled to the adjustably-coupled end portions of the cords to facilitate gripping the adjustably-coupled end portions to adjust the effective lengths of the cords. The positions and effective lengths of the cords may be adjusted to govern the resting position and orientation of the various portions of the armless eyewear on the wearer's head, thereby facilitating controlling compression amplitude or locations imposed by the armless eyewear on the wearer's head. Moreover, the armless eyewear facilitates resting the frame on the wearer's nose, thereby facilitating reducing weight carried by the wearer's ears, at least in comparison to traditional eyewear with arms, to further achieve comfortable positioning, orientation, or compression.

Illustrative Operating Environment

The armless eyewear of the present innovations imposes low levels of compression on a wearer's head, at least in comparison to sport or safety eyewear such as goggles or ballistics glasses that employs retaining straps. Accordingly, the armless eyewear of the present innovations may be comfortably employed in professional or casual settings, such as in an office or at a social event. In contrast, sport or safety eyewear that employs retaining straps typically rely on elastic straps and impose high levels of compression on the wearer's head, at least in comparison to the armless eyewear of the present innovations. For example, the armless eyewear of the present innovations may facilitate comfortable wearing when tension in the cords is low enough to fit four of the wearer's fingers between the cords 5a, 5b and each side of the wearer's head, just above the wearer's ears.

One attempt to provide an earpiece-less eyeglass frame employed a single removable retainer strap (see U.S. Pat. Nos. 7,427,133 and 9,229,245 issued to Troy L. Carter). Carter's frame employs a ball-and-socket hinge mechanism. Accordingly, the single retaining strap may be easily removed. This purported benefit may allow one or more of the balls at the ends of Carter's single retaining strap to escape from the sockets in the frame (especially as the ball-and-socket hinge mechanisms become worn down after repeated use), thereby allowing Carter's eyeglass frame to unexpectedly fall off of the wearer's face, especially when the single retaining strap is adjusted to impose small amounts of compression on the wearer's head. In contrast, the armless eyewear of the present innovations may be without complicated mechanisms that are prone to failure, such as those employed by Carter's eyeglass frame. For example, the armless eyewear of the present innovations may include a frame having end pieces that are integral to the frame and that lack any moving components, such as buckles, spring clamps, pins, or others. Furthermore, the construction of Carter's eyeglass frame may catch hair of the wearer, such as in the ball-and-socket mechanisms. In contrast, the open nature of the end-piece couplers of the armless eyewear of the present innovations may reduce a likelihood of catching the wearer's hair.

Additionally, Carter's single removable retainer strap relies on forming a loop in a middle section of the single removable retainer strap and sliding the loop through a spring-loaded clasp. Accordingly, when fitted to a wearer's head, the loop extends outward and away from the back of the wearer's head, thereby posing a risk to snagging of the loop by objects in the surrounding environment. In contrast, the armless eyewear of the present innovations may employ multiple retainer cords that may be interactively operated to adjust the effective lengths of the cords while remaining flush to the wearer's head when tightened, thereby reducing the likelihood of being snagged while worn. Moreover, Carter's single removable retainer strap relies on the spring-loaded clasp to adjust tension in the single removable strap. Accordingly, when the spring in the clasp fails after repeated use, the single retaining strap may be no longer adjustable. In contrast, the armless eyewear of the present innovations may employ adjustable couplings, such as adjustable sliding half knots, that can be retied after loosening.

Illustrative Implementation

Figure 2:
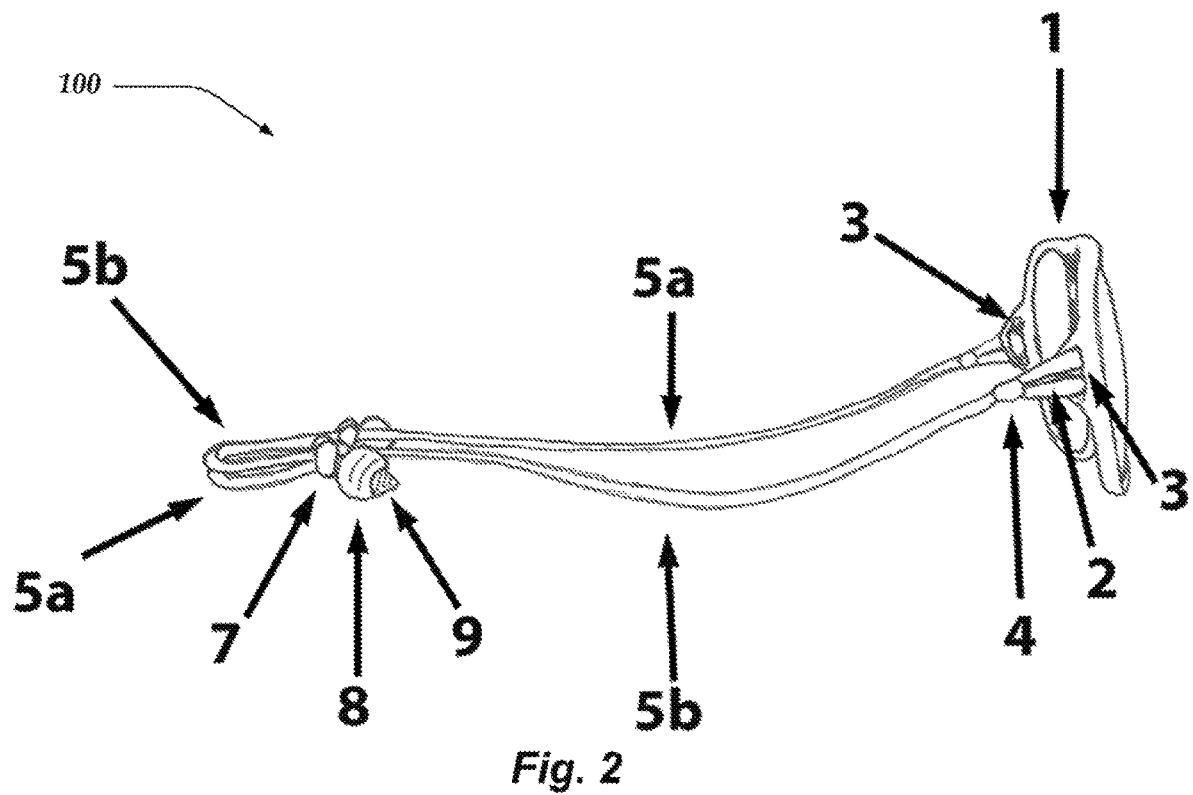
FIG. 2 shows a schematic representation of a perspective right-side view of the armless eyewear of FIG. 1.

FIG. 1 illustrates a schematic representation of a perspective front view of example armless eyewear 100 having frame 1, left cord 5a, and right cord 5b. FIG. 2 shows a schematic representation of a perspective right-side view of armless eyewear 100. Frame 1 includes left and right eye wires 1a, 1b, top bar 1c, and bridge 3. Eye wires 1a, 1b are be sized and dimensioned to receive and support lenses (although lenses are optional). Eye wires 1a, 1b may be full-rim eye wires or semi rimless eye wires. Frame 1 also includes left and right end pieces 3. Cords 5a, 5b may have end-piece couplers 2 that couple cords 5a, 5b to corresponding left and right end pieces 3. In the example illustrated in FIG. 1, end-piece couplers 2 include loops having upper loop portion 2a and lower loop portion 2b that are formed from proximal end portions of cords 5a, 5b. In other example implementations, upper and lower loop portions 2a, 2b of one or both of end-piece couplers 2 may be rotated 90 degrees to become inner and outer loop portions 2a, 2b. In these other example implementations, one or both of end pieces 3 may be rotated 90 degrees or may include the example implementation shown in FIG. 10, with a single aperture in end piece 3.

Figure 13A:
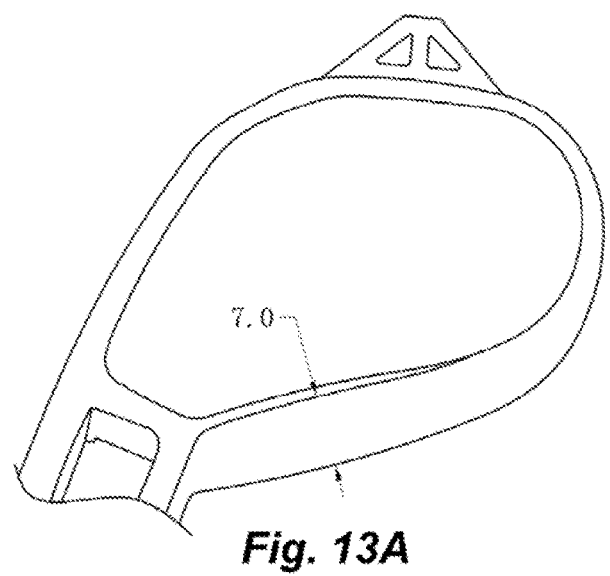
FIG. 13A illustrates a schematic representation of an isometric rear view of a portion of the frame of the armless eyewear of FIG. 1 to logically illustrate example dimensions of an example nose pad the frame.
Figure 13B:
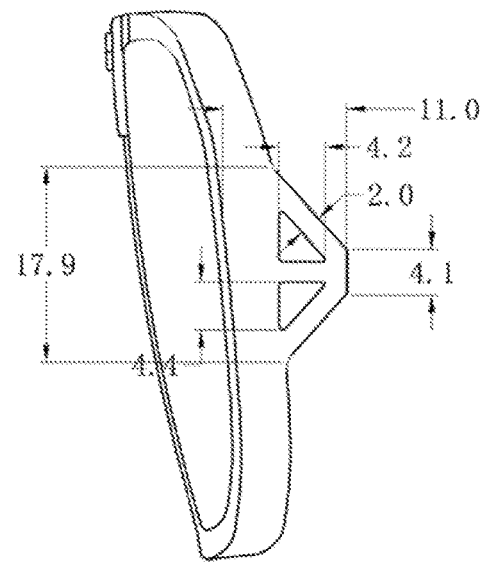
FIG. 13B shows a schematic representation of an isometric left-side view of the frame of the armless eyewear of FIG. 1 to logically show example dimensions of the left end piece.
Figure 13C:
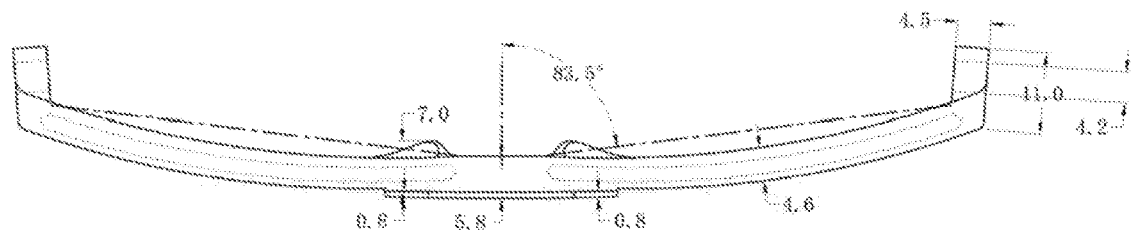
FIG. 13C illustrates a schematic representation of an isometric top view of the frame of the armless eyewear of FIG. 1 to logically show example dimensions of the nose pad, the left end piece, example eye wires of the frame, and a portion of an example top bar of the frame.
Figure 13D:
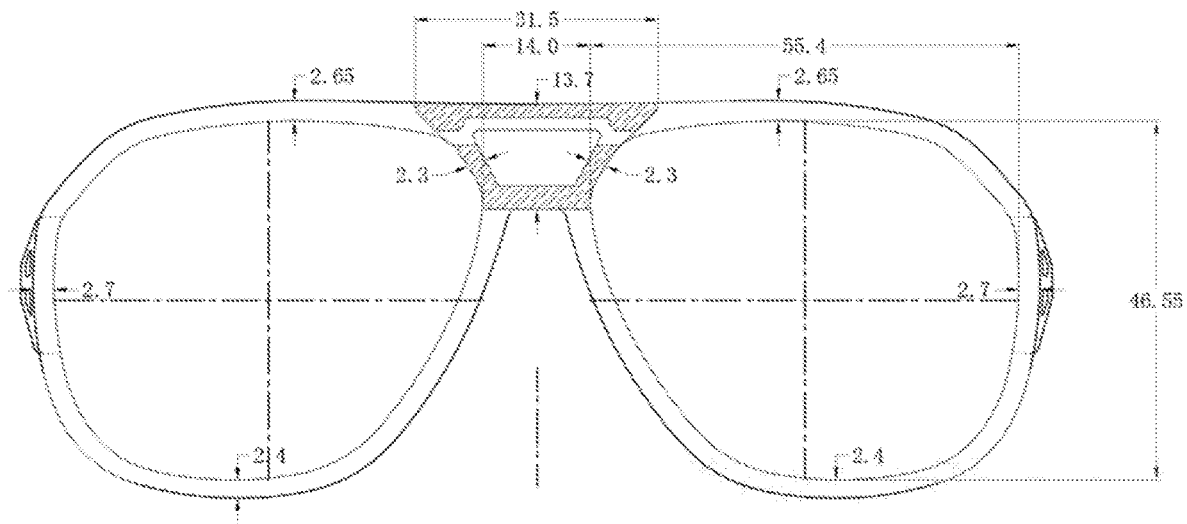
FIG. 13D shows a schematic representation of an isometric front view of the frame of the armless eyewear of FIG. 1 to logically show example dimensions of the eye wires, the top bar, and an example bridge of the frame.

As shown in FIG. 13C, the armless frame defines a lateral axis that extends from the left end piece 3 to the right end piece 3 and a central axis that is transverse to the lateral axis of the armless frame 1. Accordingly, in the example implementation shown in FIG. 10 in which the end pieces 3 define a single aperture, the aperture in the left end piece 3 defines a longitudinal axis that extends through the aperture in the left end piece 3 toward the central axis of the armless frame 1. The aperture in the right end piece 3 defines another longitudinal axis that extends through the aperture in the right end piece 3 toward the central axis of the armless frame 1.

Cords 5a, 5b may each include one or more adjustable couplers 7 disposed in distal end portions of cords 5a, 5b. One or more adjustable couplers 7 may slidably couple the distal end portion of left cord 5a to a middle portion of right cord 5b, and another one or more adjustable couplers 7 may slidably couple the distal end portion of right cord 5b to a middle portion of left cord 5a. In the example implementation shown in FIG. 1, adjustable couplers 7 may each include one or more sliding half knots that wraps around the other one of cords 5a, 5b, such as sliding half knot 7b at the distal end portion of right cord 5b in FIG. 9A or sliding half knot 7a at the distal end portion of left cord 5a in FIG. 9B. Other examples of adjustable couplers 7 include clasps, clamps, hook-and-loop fasteners, or others. Each of cords 5a, 5b may have the same or different adjustable couplers 7. In some example implementations, only one of cords 5a, 5b includes adjustable coupler 7. The effective length of a given one of cords 5a, 5b in the example illustrated in FIG. 1 may be the distance along the given cord between corresponding end piece 3 and adjustable coupler 7 at the distal end of the given cord. Accordingly, adjustable couplers 7 may be moved closer to or further from each other to adjust the effective lengths of cords 5a, 5b.

In some example implementations, one or more grip elements 8 may be disposed in the distal end portion of one or more of cords 5a, 5b, distal or proximal to adjustable couplers 7 to facilitate gripping the distal end portions of cords 5a, 5b during adjustment of the effective lengths. Examples of grip elements 8 include beads with stoppers, beads without stoppers, self-locking beads, or other types of trim pieces. Each of cords 5a, 5b may have the same or different grip elements 8. In some example implementations, only one or neither of cords 5a, 5b includes grip element 8. In some implementations, distal tip portions of cords 5a, 5b include caps 9 (see FIGS. 9A and 9B) to secure grip elements 8 or to prevent fraying of cords 5a, 5b. Example caps 9 include metal, threaded stitching, plastic, heat-sealing (for example, with nylon, glue, or other seals), or other caps. In some example implementations only one or neither of cords 5a, 5b includes cap 9.

Figure 3:
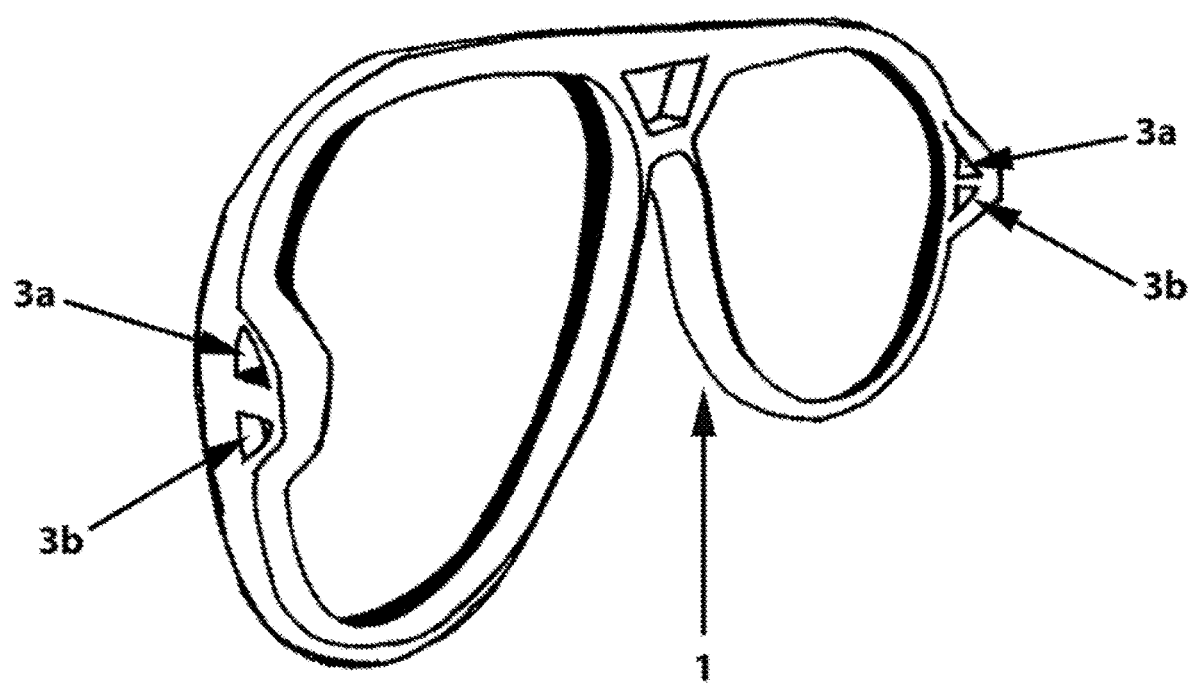
FIG. 3 illustrates a schematic representation of a perspective rear left-side view of the frame of the armless eyewear of FIG. 1, without the adjustable cords to show example left and right end pieces of the frame.
Figure 4:
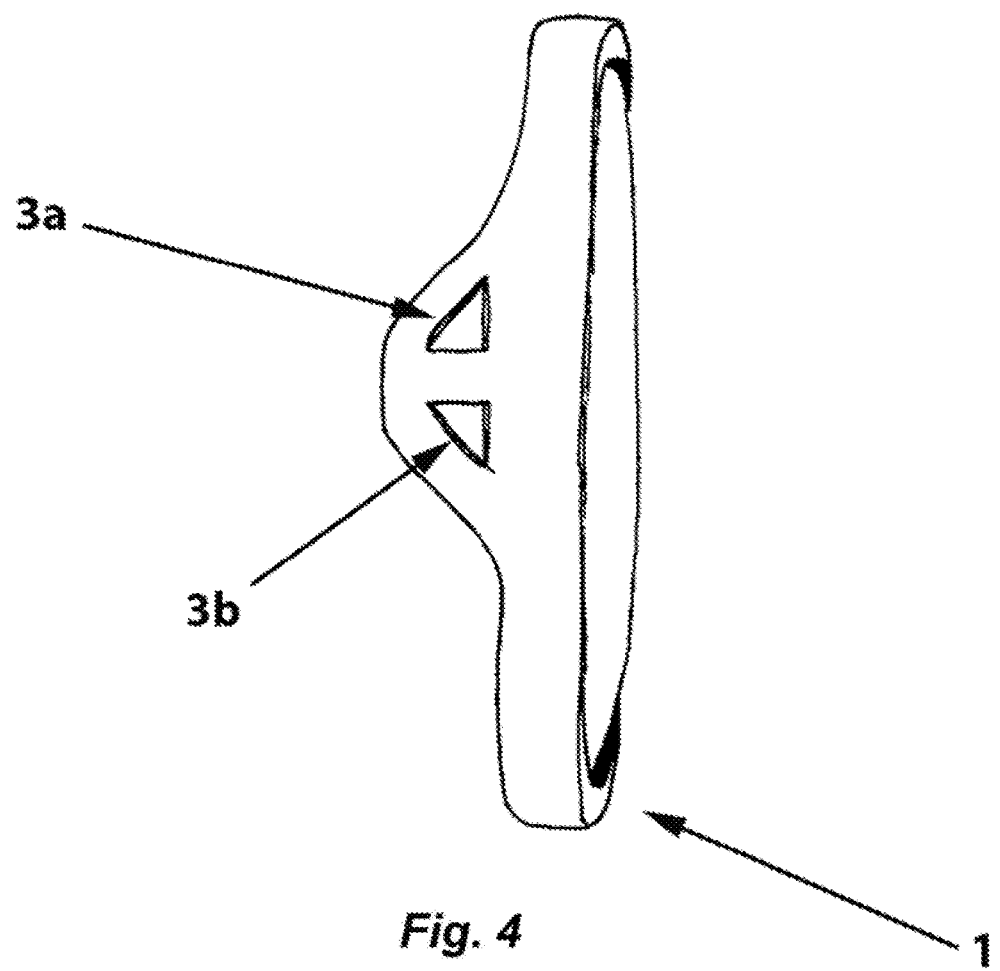
FIG. 4 shows a schematic representation of a perspective right-side view of the frame of the armless eyewear of FIG. 1.
Figure 10:
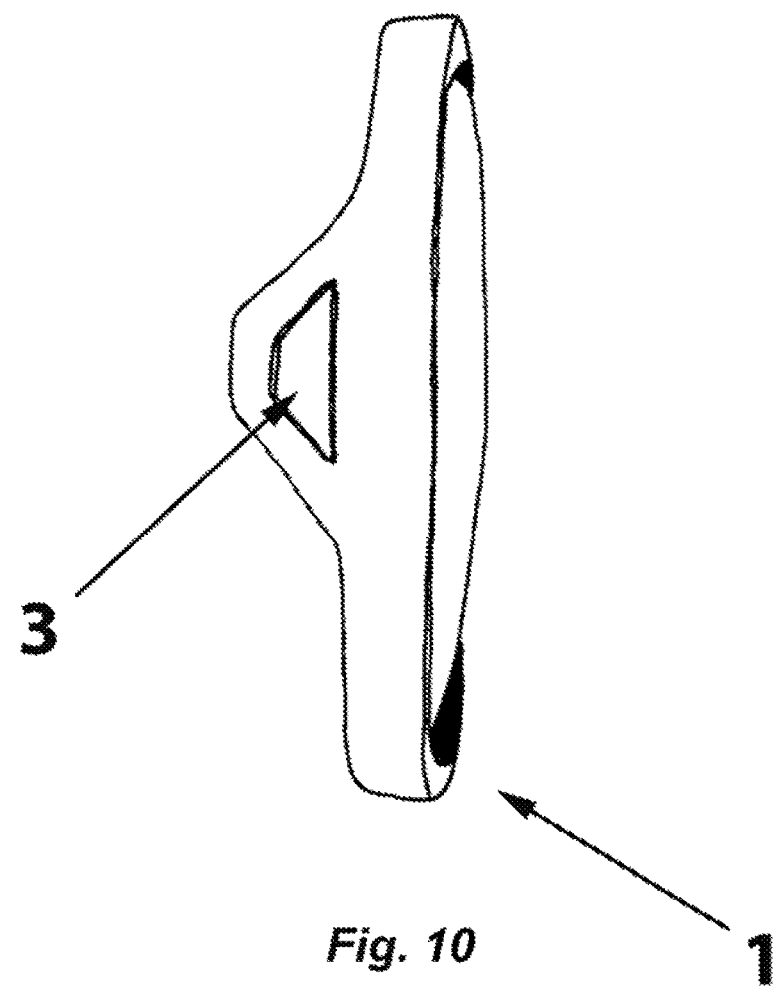
FIG. 10 shows a schematic representation of a perspective right-side view of the frame of the armless eyewear of FIG. 1, with another example right end piece.

FIGS. 3 and 4 illustrate schematic representations of frame 1 of armless eyewear 100, without adjustable cords 5a, 5b to show example left and right end pieces 3 of frame 1. In the example implementation illustrated in FIGS. 3 and 4, each end piece 3 projects rearward from frame 1 and includes upper aperture 3a and lower aperture 3b. FIG. 10 shows another example implementation, with a single aperture in end piece 3. In some example implementations, one or more end pieces 3 may be formed around the proximal end portion of one or more of cords 5a, 5b, thereby facilitating omission of one or more associated end-piece couplers 2. For example, the distal end portion of cord 5a or cord 5b may be inserted into a mold at a position that corresponds to associated end piece 3, and the mold may be injected with one or more materials included in frame 1 to cover the distal end portion of cord 5a or 5b with the one or more materials, thereby facilitating securing the distal end portion of cord 5a or 5b in end piece 3 when the one or more materials solidify. Accordingly, in some example implementations, one or more end pieces 3 may lack apertures. In some example implementations, left and right end pieces 3 have the same or different end pieces 3. In some example implementations, one or more portions of frame 1 may have sufficient buoyancy to float in fresh water or salt water, with or without the cords 5a, 5b attached.

Figure 5:
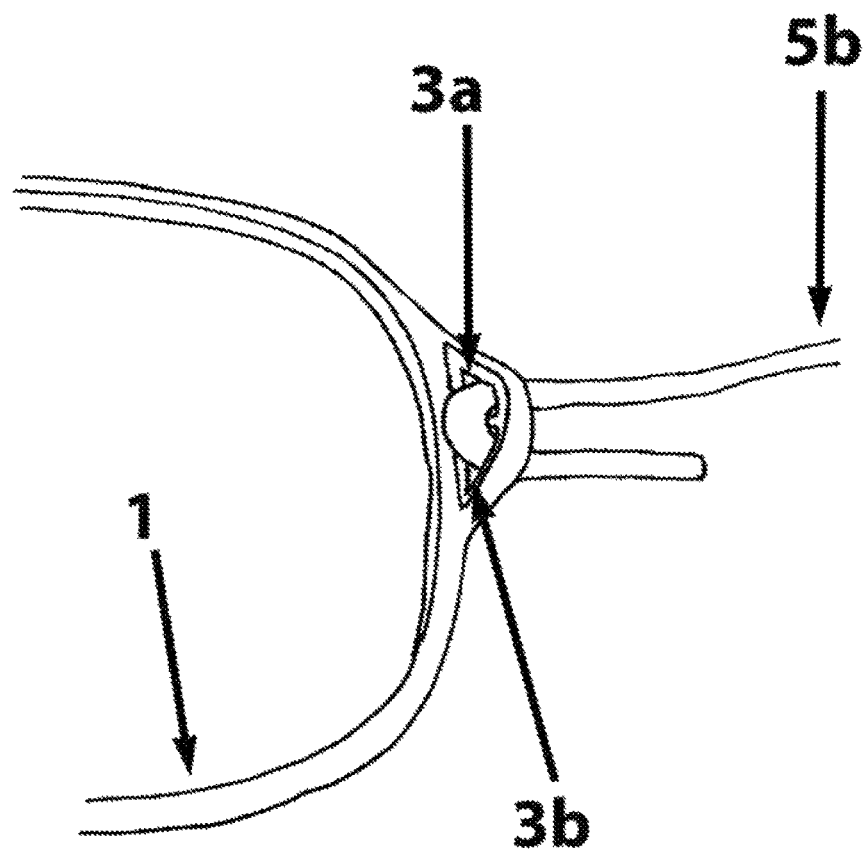
FIG. 5 illustrates a schematic representation of a perspective rear view of a portion of the frame of the armless eyewear of FIG. 1, with one of the adjustable cords being threaded through the right end piece.
Figure 6:
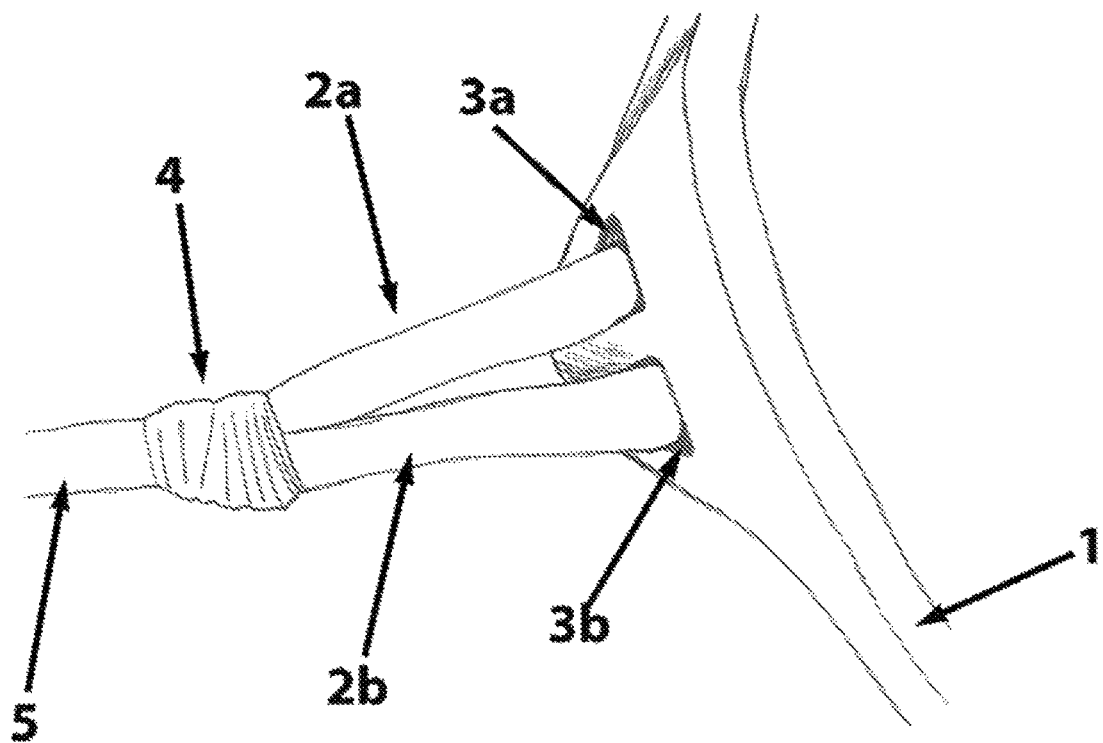
FIG. 6 illustrates a schematic representation of a perspective front right-side view of a portion of armless eyewear of FIG. 1, with an example end-piece coupler for securing one of the adjustable cords to the right end piece.
Figure 7:
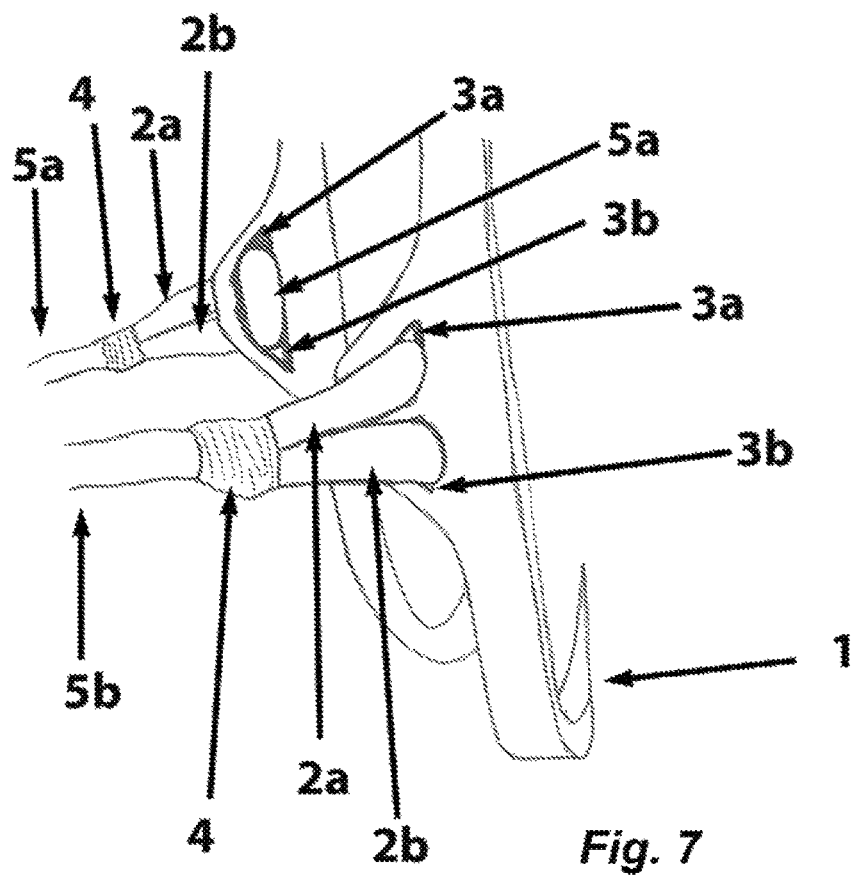
FIG. 7 shows a schematic representation of a perspective right-side view of a portion of the armless eyewear of FIG. 1, with the adjustable cords secured to the left and right end pieces.

FIGS. 5 and 6 illustrate schematic representations of right end piece 3 with right adjustable cord 5b being coupled to right end piece 3. FIG. 7 shows a schematic representation of a perspective right-side view of a portion of armless eyewear 100 to show left and right adjustable cords 5a, 5b coupled to left and right end pieces 3. In the example implementation shown in FIGS. 5-7, end-piece couplers 2 are arranged with upper loop portion 2a extending into upper aperture 3a and with lower loop portion 2b extend around a middle section between upper and lower apertures 3a, 3b to extend out from lower aperture 3b. In the example implementation shown in FIGS. 5-7, one or more loop fasteners 4 disposed at the proximal end portion of each of cords 5a, 5b couple a distal end portion of lower loop portion 2b to upper loop portion 2a. Examples of loop fastener 4 include threaded stitching, toothed metal, toothed plastic, toothed composite, metal clamps, plastic clamps, composite clamps, heat-sealing (for example, with nylon, glue, or other seals), or others. Cords 5a, 5b may have the same or different end-piece couplers 2. Upper and lower apertures 3a, 3b may have position and orientations relative to each other and frame 1 that facilitate frame 1 resting on the wearer's face at a preconfigured angle. End pieces 3 may be position and oriented relative to frame 1 to facilitate frame 1 resting on the wearer's face at a preconfigured angle or position. The preconfigured angles or positions may be predefined based on a standard face shape (for example, a model of a mean face shape for a demographic, a model of a particular individual's face shape, or another standard shape) or a standard tension applied to cords 5a, 5b.

Figure 8:
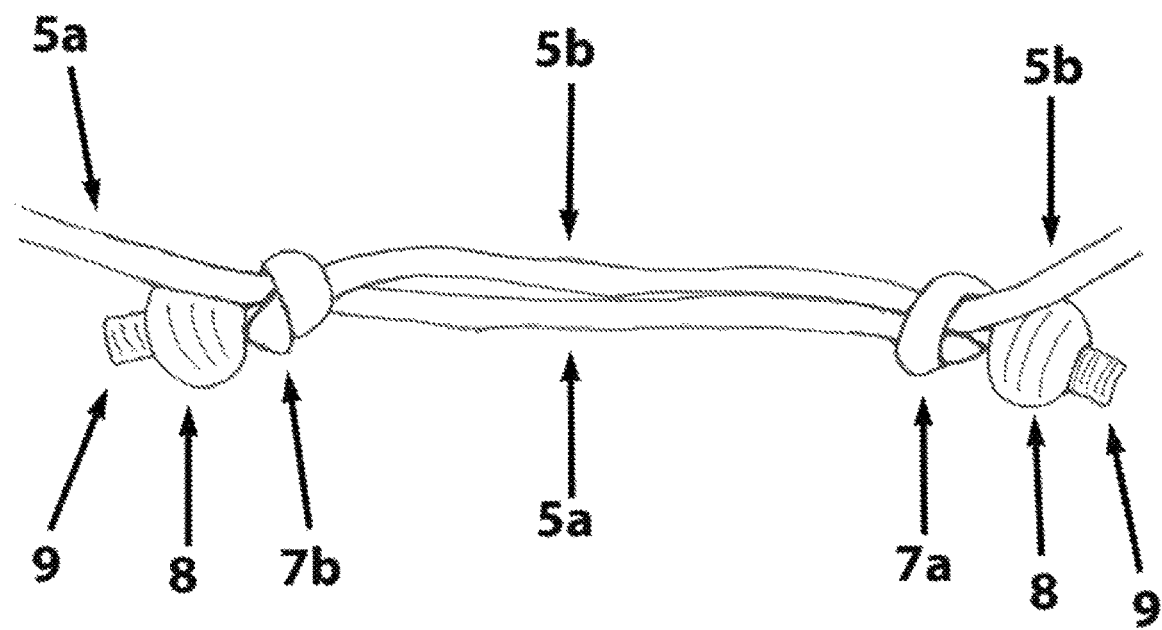
FIG. 8 illustrates a schematic representation of a front view of overlapping portions of the adjustable cords of the armless eyewear of FIG. 1.
Figure 9A:
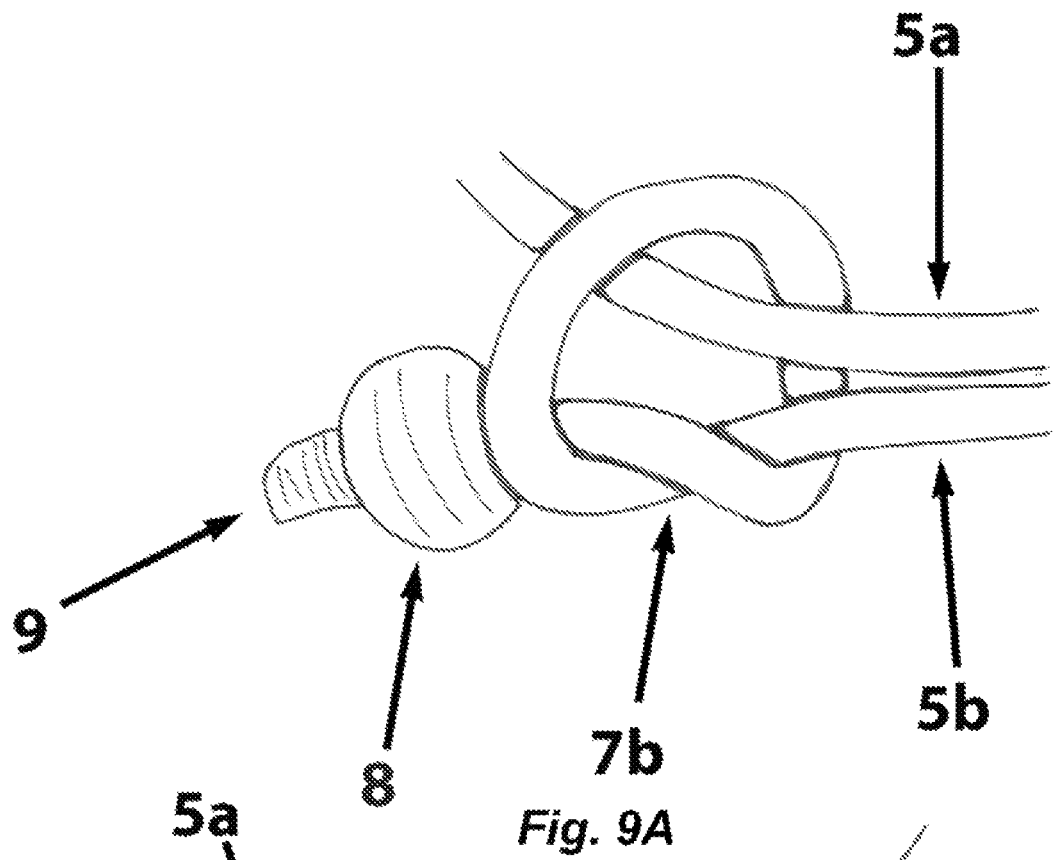
FIG. 9A shows a schematic representation of an example knot in one of the adjustable cords of the armless eyewear of FIG. 1.
Figure 9B:
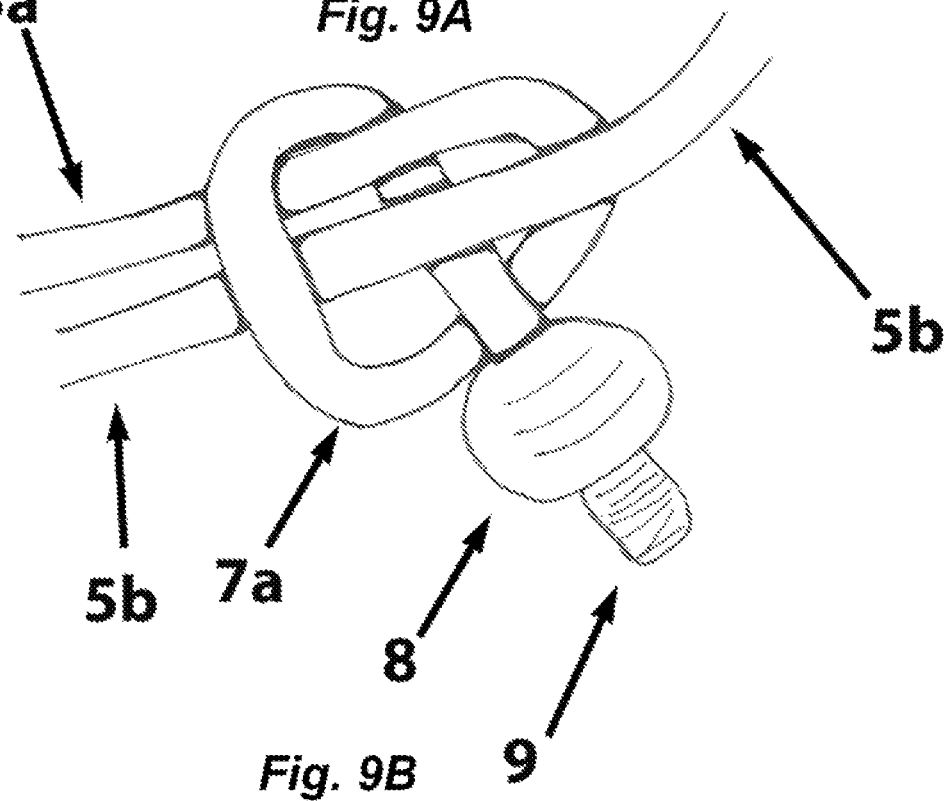
FIG. 9B illustrates a schematic representation of an example knot in one of the adjustable cords of the armless eyewear of FIG. 1.

FIG. 8 shows a schematic representation of a front view of overlapping portions of adjustable cords 5a, 5b of armless eyewear 100, including adjustable couplers 7a, 7b in a locked configuration. FIGS. 9A and 9B show adjustable couplers 7a, 7b in an unlocked configuration. In the locked configuration, adjustable couplers 7a, 7b are strongly secured to cords 5a, 5b in comparison to the unlocked configuration, thereby facilitating increasing a degree of difficulty in movement of adjustable couplers 7a, 7b along cords 5a, 5b relative to the unlocked configuration. In the unlocked configuration, adjustable couplers 7a, 7b are more loosely wrapped around cords 5a, 5b, thereby facilitating increasing a degree of ease of adjustment of the effective lengths of cords 5a, 5b in comparison to the locked configuration. As shown in FIGS. 1, 2, 8, and 9, because adjustable couplers 7a facilitate adjusting the effective lengths of cords 5a, 5b, individually-nonadjustable cords 5a, 5b operate in conjunction as adjustable cords 5a, 5b. In some example implementations, one or more of cords 5a, 5b or grip elements 8 may have sufficient buoyancy to float in fresh water or salt water, with or without frame 1 attached.

Figure 11:
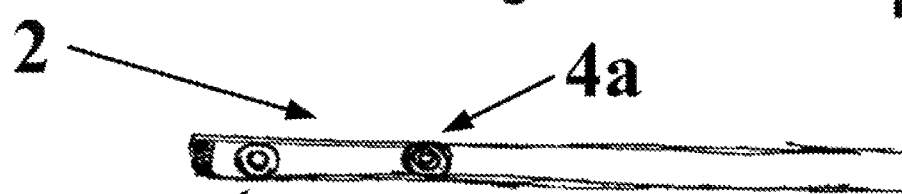
FIG. 11 illustrates a schematic representation of a perspective side view of another example end-piece coupler for securing one of the adjustable cords to one of the end pieces of the armless eyewear of FIG. 1.
Figure 12:
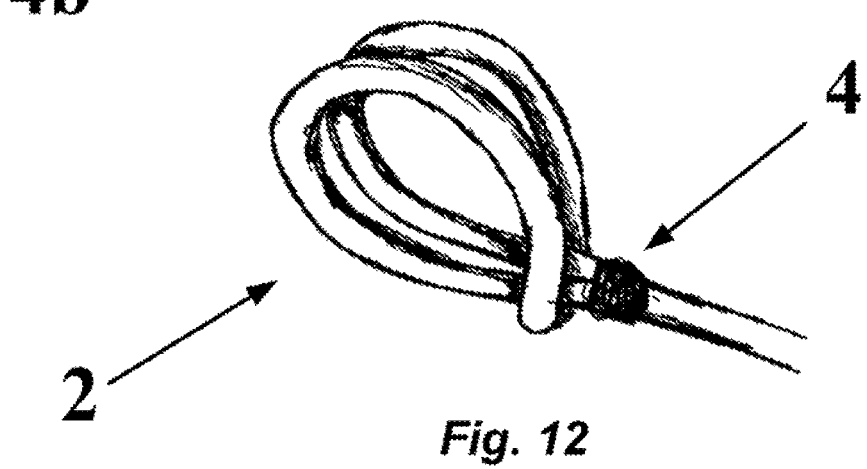
FIG. 12 shows a schematic representation of a perspective view of another example end-piece coupler for securing one of the adjustable cords to one of the end pieces of the armless eyewear of FIG. 1.

FIGS. 11 and 12 show schematic representations of further example end-piece couplers 2 that facilitate repeated removal and attachment of cords 5a, 5b. In the example illustrated in FIG. 11, end-piece coupler 2 includes proximal loop fastener 4a and distal loop fastener 4b. In the example shown in FIG. 11, one of loop fasteners 4a, 4b includes a female snap portion, and the other one of loop fasteners 4a, 4b includes a male snap portion to facilitate removably coupling loop fasteners 4a, 4b to each other. In the example shown in FIG. 12, loop fastener 4 secures end-piece coupler 2 in a loop prior to coupling end-piece coupler 2 to end piece 3. The loop can be slid through an aperture in end piece 3, and the distal end portion of associated cord 5a or 5b can be slid through the loop to obtain the configuration shown in FIG. 12 (shown without frame 1). To remove cord 5a or 5b from end piece 3, the distal end portion may be pulled back through the loop and the loop pulled out of the aperture in end piece 3. Accordingly, example end-piece couplers 2 shown in FIGS. 11 and 12 facilitate repeated removal and attachment of cords 5a, 5b to frame 1.

Frame 1 may include one or more materials, such as acetate, bamboo or another wood, wood composite, polycarbonate (PC) or another plastic, carbon fiber, bull horn, metal, nylon, or other materials. Cords 5a, 5b may include one or more materials, such as wire, mesh chain, cotton, nylon, waxed polyester cotton, bamboo fiber, hemp fiber, elastic materials, polyester, or other materials. Cords 5a, 5b may include the same or different materials. One or both of cords 5a, 5b may be waxed (facilitating water resistance) or unwaxed. Grip elements 8 may include one or more materials, such as acetate, bamboo or another wood, wood composite, polycarbonate (PC) or another plastic, carbon fiber, bull horn, metal, nylon, or other materials. Grip elements 8 may include the same or different materials.

In some example implementations, armless eyewear 100 may be equipped with one or more locators, such as one or more beacons, transmitters, transceivers, or others, that emit, backscatter, or reflect one or more signals to assist in locating armless eyewear 100. The one or more locators may be passive (e.g., without a battery) or active (e.g., with a battery). For example, the one or more locators may backscatter, with or without modulation, one or more received signals to assist in locating armless eyewear 100. As another example, the one or more locators may include one or more power supplies to energize the one or more locators to facilitate emitting a signal, with or without modulation, to assist in locating armless eyewear 100. In some examples, the one or more signals provided by the one or more locators may include a location of armless eyewear 100 or information from which the location may be derived (e.g., Global Positioning System (GPS) coordinates or others). In some example implementations, the one or more locators may include a transmitter or transceiver that complies with one or more communication standards, such as one or more communication standards defined under the mark BLUETOOTH or others, that facilitate communication to or with one or more smart phones or other mobile devices. The one or more locators may be included in or attached to one or more portions of one or more of frame 1, cord 5a, cord 5b, one or more grip elements 8, or others.

FIGS. 13A-13D show various isometric views of frame 1 to logically illustrate example dimensions of various portions of frame 1. The dimensions included in the logical illustration are in millimeters, except the angles are measured in degrees. Each of the dimensions is an example and non-limiting. One or more of the dimensions may be increased or decreased to provide various results such as increasing durability, weight reduction, balancing adjustments, and others. Example ranges of one or more of the dimensions may include a reduction to as little as half of the depicted value or an increase to as much as double the depicted value, or reductions or increases to any value in between.

Various examples have been described above with reference to the accompanying drawings, which form a part hereof, and which show, by way of illustration, specific example embodiments by which the invention may be practiced. The embodiments may, however, be embodied in many different forms and should not be construed as limited to the examples set forth herein; rather, these examples are provided so that this disclosure will be thorough and complete and will fully convey the scope of the embodiments to those skilled in the art. Among other things, the various embodiments may be methods, systems, or devices. The present detailed description is, therefore, not to be taken in a limiting sense.

Throughout the specification and claims, the following terms take the meanings explicitly associated herein, unless the context clearly dictates otherwise. The phrase "in one embodiment," "in one example," or "in one implementation" as used herein does not necessarily refer to the same embodiment, though it may. Furthermore, the phrase "in another embodiment," "in another example," or "in another implementation" as used herein does not necessarily refer to a different embodiment, although it may. Thus, as described throughout, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Further, plural references should be interpreted as also disclosing singular references. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function. Also, the use of the terms "proximal" and "distal" are used consistently with respect to all elements of cords 5a, 5b and armless eyewear 100 and are defined relative to the proximal end portion of cords 5a, 5b, which couple to frame 1. The distal end portion of cords 5a, 5b have adjustable couplers 7 therein.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. For example, frame 1 has been shown as having a particular style, yet, in some example implementations, frame 1 may have different styles than those shown in the figures. Frame 1 may have standard shapes and dimensions or may be custom made for a particular individual or demographic. Any two or more elements of armless eyewear 100 of the present innovations may include the same or different corresponding shapes, dimensions, positions, orientations, couplers, materials, manners of functioning, or other characteristics. For example, one coupler may be implemented with one example described above while another corresponding coupler may be implemented with a different example described above, a combination of two or more examples described above, or may be omitted. Also, each element of frame 1 can be integral to frame 1 or separable from frame 1. Moreover, each disclosed feature or element can be omitted or can be implemented in armless eyewear 100 in addition or alternative to each other disclosed feature, unless

What is claimed as new and desired to be protected by Letters Patent of the United States is:

1. Eyewear, comprising:
an armless frame having a left end piece and a right end piece, each of the left and right end pieces defining an aperture;
a left cord having a proximal end portion and a distal end portion, the proximal end portion of the left cord extending through the aperture in the left end piece;
a right cord having a proximal end portion and a distal end portion, the proximal end portion of the right cord extending through the aperture in the right end piece; and
an adjustable coupler that couples the left cord to the right cord, the adjustable coupler including a first adjustable coupler that slidingly couples the left cord to the right cord and a second adjustable coupler that slidingly couples the right cord to the left cord, the first adjustable coupler being at a fixed position on the left cord and being slidable along the right cord, the second adjustable coupler being at a fixed position on the right cord and being slidable along the left cord, the first and second adjustable couplers being arranged to prevent the left and right cords from decoupling from each other responsive to the left and right cords being pulled away from each other,
wherein the proximal end portion of the left cord extends through the aperture in the left end piece, around a portion of the left end piece that defines the aperture in the left end piece, and around a portion of the left cord,
wherein the armless frame defines a lateral axis that extends from the left end piece to the right end piece and a central axis that is transverse to the lateral axis of the armless frame, and one of the aperture in the left end piece or the aperture in the right end piece defines a longitudinal axis that extends through the one of the aperture in the left end piece or the aperture in the right end piece and toward the central axis of the armless frame.

2. The eyewear of claim 1, wherein the left and right cords have effective lengths that respectively extend from the left and right end pieces to the first adjustable coupler and the second adjustable coupler, wherein movement of the first adjustable coupler or the second adjustable coupler along one of the left or right cords varies the effective length of the one of the left or right cords.

3. The eyewear of claim 1, wherein one of the first adjustable coupler or the second adjustable coupler surrounds a portion of one or more of the left or right cords and imposes an adjustable amount of compression on the surrounded portion of the one or more of the left or right cords, an increase in the amount of compression provides a locked configuration, a decrease in the amount of compression relative to the locked configuration provides an unlocked configuration, the one of the first adjustable coupler or the second adjustable coupler in the locked configuration prevents movement of the one of the first adjustable coupler or the second adjustable coupler along the one or more of the left or right cords, and the one of the first adjustable coupler or the second adjustable coupler in the unlocked configuration increases a degree of ease of movement of the one of the first adjustable coupler or the second adjustable coupler along the one or more of the left or right cords relative to the locked configuration.

4. The eyewear of claim 1, wherein the second adjustable coupler includes a sliding knot in the right cord, the sliding knot being wrapped around the left cord.

5. The eyewear of claim 1, further comprising:
a first loop fastener disposed at the proximal end portion of the left cord; and
a second loop fastener disposed at the proximal end portion of the right cord.

6. The eyewear of claim 1, wherein each of the left and right end pieces lacks moving components.

7. A method of making eyewear, comprising:
providing an armless frame having a left end piece and a right end piece, each of the left and right end pieces defining an aperture;
providing a left cord having a proximal end portion and a distal end portion;
threading the proximal end portion of the left cord through the aperture in the left end piece;
providing a right cord having a proximal end portion and a distal end portion;
threading the proximal end portion of the right cord through the aperture in the right end piece; and
coupling the left cord and the right cord to each other with an adjustable coupler, the adjustable coupler including a first adjustable coupler that sliding couples the left cord to the right cord and a second adjustable coupler that sliding couples the right cord to the left cord, the first adjustable coupler being at a fixed position on the left cord and being slidable along the right cord, the second adjustable coupler being at a fixed position on the right cord and being slidable along the left cord, the first and second adjustable couplers being arranged to prevent the left and right cords from decoupling from each other responsive to the left and right cords being pulled away from each other,
wherein threading the proximal end portion of the left cord through the aperture in the left end piece includes causing the proximal end portion of the left cord to extend through the aperture in the left end piece, around a portion of the left end piece that defines the aperture in the left end piece, and around a portion of the left cord,
wherein the armless frame defines a lateral axis that extends from the left end piece to the right end piece and a central axis that is transverse to the lateral axis of the armless frame, and one of the aperture in the left end piece or the aperture in the right end piece defines a longitudinal axis that extends through the one of the aperture in the left end piece or the aperture in the right end piece and toward the central axis of the armless frame.

8. The method of claim 7, further comprising one of the first adjustable coupler or the second adjustable coupler along one of the left or right cords, wherein the left and right cords have effective lengths that respectively extend from the left and right end pieces to the first adjustable coupler and the second adjustable coupler, and moving the one of the first adjustable coupler or the second adjustable coupler varies the effective length of the one of the left or right cords.

9. The method of claim 7, wherein coupling the left cord and the right cord to each other comprises:
surrounding a portion of the right cord with the first adjustable coupler;

surrounding another portion of the left cord with the second adjustable coupler;

moving the first and second adjustable couplers respectively along the left and right cords; and increasing an amount of compression imposed by the first and second adjustable couplers on the surrounded portions of the left and right cords.

10. The method of claim 7, further comprising:

fastening the threaded portion of the left cord to a more distal portion of the left cord with a first loop fastener; and fastening the threaded portion of the right cord to a more distal portion of the right cord with a second loop fastener.

11. The method of claim 7, wherein each of the left and right end pieces lacks moving components.

12. The eyewear of claim 1, wherein the proximal end portion of the left cord extends through the aperture in the left end piece, around the portion of the left end piece that defines the aperture in the left end piece, around the portion of the left cord, again around the portion of the left end piece that defines the aperture in the left end piece, and again through the aperture in the left end piece.

13. The eyewear of claim 1, wherein one or more of the first adjustable coupler or the second adjustable coupler includes a sliding half knot.

14. The method of claim 7, wherein threading the proximal end portion of the left cord through the aperture in the left end piece includes causing the proximal end portion of the left cord to extend through the aperture in the left end piece, around the portion of the left end piece that defines the aperture in the left end piece, around the portion of the left cord, again around the portion of the left end piece that defines the aperture in the left end piece, and again through the aperture in the left end piece.

15. The method of claim 7, wherein one or more of the first adjustable coupler or the second adjustable coupler includes a sliding half knot.

16. The eyewear of claim 1, wherein the frame includes a left rim and a right rim, the left end piece being disposed at a left end portion of the left rim, the right end piece being disposed at a right end portion of the right rim.

17. The eyewear of claim 16, wherein one or more of the left end piece or the right end piece is coupled to a corresponding one of the left rim or the right rim.

18. The eyewear of claim 16, wherein one or more of the left end piece or the right end piece is integral to a corresponding one of the left rim or the right rim.

19. The eyewear of claim 16, wherein one or more of the left rim or the right rim is defined by one or more full-rim eye wires.

20. The eyewear of claim 16, wherein one or more of the left rim or the right rim is defined by one or more semi rimless eye wires.

* * * * *